US008326761B1

(12) United States Patent
Hecht et al.

(10) Patent No.: US 8,326,761 B1
(45) Date of Patent: Dec. 4, 2012

(54) SYSTEM AND METHOD FOR MICR-BASED DUPLICATE DETECTION AND MANAGEMENT

(75) Inventors: Alan W. Hecht, Chanhassen, MN (US); Rick Rotella, Phoenix, AZ (US); Brent Mangum, West Jordan, UT (US); Kathy Smalley, Anthem, AZ (US); Jack Tobey, Phoenix, AZ (US); Kathy Tyo, Alameda, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 13/247,731

(22) Filed: Sep. 28, 2011

Related U.S. Application Data (62) Division of application No. 12/106,934, filed on Apr. 21, 2008, now Pat. No. 8,060,442.

(60) Provisional application No. 60/915,403, filed on May 1, 2007.

(51) Int. Cl.
  *G06Q 40/00* (2012.01)
(52) U.S. Cl. ......................................................... 705/45
(58) Field of Classification Search ..................... 705/45, 705/35
  See application file for complete search history.

(56) References Cited

U.S. PATENT DOCUMENTS

| 7,028,886 B1 * | 4/2006 | Maloney ........................ 235/375 |
| 7,263,506 B2 | 8/2007 | Lee |
| 2002/0194174 A1 | 12/2002 | Calkins |
| 2005/0015341 A1 | 1/2005 | Jackson |
| 2006/0041506 A1 | 2/2006 | Mason |
| 2008/0103790 A1 * | 5/2008 | Abernethy et al. ............... 705/1 |

OTHER PUBLICATIONS

Controlling Duplicate IRDs—Appling Lessons Learned from ECP; Sep. 2005, 15 pages.
Payments Technology; Copyright 2003 Carreker Corporation, 2 pages.
Sweeney, Paul; New Weapons, Nov. 2000, 4 pages.
Turner et al.; Check Fraud: Beware Standard Bank Agreements! Copyright 2004 Wiley Periodicals, Inc., 4 pages.

* cited by examiner

*Primary Examiner* — Elda Milef
(74) *Attorney, Agent, or Firm* — Merchant & Gould P.C.

(57) ABSTRACT

A system and method for MICR-based duplicate detection and management identifies duplicate presented items on day one across a plurality of payment channels, prior to posting, preventing them from impacting financial institution customers by rerouting to an adjustments team. Inquiry files containing MICR data for a plurality of presented items are evaluated by a duplicate detection module. Each item presented is evaluated against all previous items based on its MICR line. Unique items are processed in the usual manner. Duplicate suspects undergo further processing. Suspects having identical MICR data, but that are not duplicates, such as NSF (non-sufficient funds) checks being re-deposited, are identified and posted. The remaining suspects go in the suspect queue of a universal workstation. After being researched, suspects found not to be duplicates are posted. The remaining suspects are flagged as duplicates and routed to an adjustor for further action.

15 Claims, 10 Drawing Sheets

SYSTEM AND METHOD FOR MICR-BASED DUPLICATE DETECTION AND MANAGEMENT

BACKGROUND OF THE INVENTION

1. Field of the Invention

The invention generally relates to systems for management of financial records. More particularly, the invention relates to a method and system for MICR (magnetic ink character recognition)-based duplicate detection and management.

2. Background Information

The first standards for electronic data interchange (EDI) were published in 1968. Business entities, looking for ways to reduce the expense of transaction processing and improve efficiency, have recognized the advantages offered by electronic transaction processing and have been steadily moving away from hard-copy paper transactions. In many industries, electronic transactions have virtually replaced paper.

An early result of the efforts of financial institutions to find ways of facilitating paperless check transactions was the AUTOMATED CLEARINGHOUSE (ACH) NETWORK, a secure payment transfer system that now connects all U.S. financial institutions. The ACH NETWORK now acts as the central clearing facility for all Electronic Fund Transfer (EFT) transactions that occur nationwide in the United States. The ACH NETWORK is what is responsible for allowing such services as online bill pay, direct deposit, and direct debiting, and has proven to be a viable and cost effective alternative to the use of paper checks.

Accounts receivable check conversion (ARC), which allows business entities that receive consumers' checks at remittance and lockbox locations to convert them into electronic ACH payments, is used for consumer bill payments such as credit cards, mortgages, insurance premiums, and telecommunications and utility bills. In a similar fashion, the POP (point-of-purchase) application permits a check presented in-person to a merchant for purchase to be presented as an ACH entry.

While financial institutions and consumers have benefited greatly from EFT, ACH, ARC and POP, problems arise with check conversion when a merchant converts a check into an ACH payment, and then, also submits the paper check for payment. The result is a double-debit against the consumer account.

The Check Clearing for the 21st Century Act (Check 21) became law in 2003, and went into effect in 2004. Check 21 is designed to foster innovation in the payments system and to enhance its efficiency by reducing some of the legal impediments to check truncation—conversion of a check to an electronic debit or image of the check. The law facilitates check truncation by creating a new negotiable instrument called a substitute check, often called an IRD (image replacement document) which permits banks to: truncate original checks; process check information electronically; and to deliver substitute checks to banks that want to continue receiving paper checks. A substitute check is the legal equivalent of the original check and includes all the information contained on the original check. It is envisioned that, ultimately, banks will simply exchange images of financial instruments and the MICR line data, doing away even with substitute checks.

In the developing environment, with such a large variety of payment types and delivery processes—IRD (image replacement documents), ECL (electronic cash letter), ARC, ATM (automated teller machine), ACH and corporate image deposits—it is increasingly likely that the same transaction will be presented for payment more than once. Checks can be converted to IRD or Image Presentment files which can be presented multiple times and across multiple channels. Check conversion to ACH presents a risk of duplicate presentment as the paper items can make their way into the payment stream via other channels.

The problem of cross-channel duplicate items has been recognized in the banking industry and some progress has been made toward identifying the duplicate items.

Duplicate detection in general involves estimating similarity of electronic documents and then taking steps to identify documents that are either identical or substantially identical.

One approach involves calculating a hash value for each document and comparing hash values. If the hash values are equal, the documents are determined to be duplicates. By comparing hash values, it is possible to identify documents that are identical to each other based on their having identical hash values.

Another approach involves the use of similarity metrics to determine the similarity of documents to each other. Using this approach, even if they do not match precisely, documents whose semantic similarity, as indicated by a computed similarity metric, exceeds a predetermined threshold are said to be duplicates.

Yet another approach, instead of comparing whole documents, isolates significant terms from the documents and uses the significant terms to create a digest for each document. If there is a collision between the digests of two documents, the documents are determined to be duplicates of each other.

Distributed check capture and Check 21 both pose an increased risk of creating and/or posting duplicate debits in either a single channel or across multiple channels. In the traditional paper processing model this risk was much smaller due to a dependency on the receipt of physical paper to facilitate posting to the customers account. In the multi-channel environment, duplicate postings have conventionally been identified after they occur, either by minimal day two reporting or more often through notification by the impacted customer.

Some progress has been made in identifying duplicate IRDs. Currently, however, duplicates are only identified after posting via posting reports or after receipt of a customer call. Thus, the problem of identifying duplicate items across payment channels on day 1, prior to posting, remains. The problem of double postings seriously impacts the banking industry because of its deleterious effect on the relationship between the financial institution and its customers. Additionally, correction of the errors imposes a significant cost. Thus far, there exists no comprehensive solution to the problem.

SUMMARY OF THE INVENTION

Definitions

Deposits: Items deposited to a financial institution that are written by customers of the financial institution.

Inclearings: items written by customers of a bank, but deposited at other financial institutions. After these institutions have processed them for their accounts, inclearing items are returned to the bank of origin and debited against that bank's accounts. Inclearings and deposits are collectively known as "on-us items."

Transit items: Items issued by a financial institution other than the financial institution where they are deposited; also known as "on-others" items.

Presentment: Submission of an item for payment to the issuing institution.

MICR line or MICR data: conventionally, the MICR line on a paper check is a string of characters printed in magnetic ink that describes the check or the transaction: the issuing financial institution, the account number, the check number, the amount and so on. Within the context of the present invention, the MICR data can be seen as the data contained within the MICR line, which, in totality, uniquely identifies the instrument or transaction. Also within the context of the present invention, the MICR data or the MICR line also refers to analogous data applied to non-paper instruments such as electronic images and ACH transactions that uniquely identifies these instruments or transactions.

A system and method for MICR-based duplicate detection and management identifies duplicate presented items on day one across a plurality of payment channels, prior to posting, preventing them from impacting financial institution customers by rerouting to an adjustments team. Inquiry files containing MICR data for a plurality of presented items are evaluated by a duplicate detection module. Each item presented is evaluated against all previous items based on its MICR line. Unique items are processed in the usual manner. Duplicate suspects undergo further processing. Suspects having identical MICR data, but that are not duplicates, such as NSF (non-sufficient funds) checks being re-deposited, are identified and posted. The remaining suspects go in the suspect queue of a universal workstation. After being researched, suspects found not to be duplicates are posted. The remaining suspects are flagged as duplicates and routed to an adjustor for further action.

DETAILED DESCRIPTION

A system and method for MICR-based duplicate detection and management identifies duplicate presented items on day one across a plurality of payment channels, prior to posting, preventing them from impacting financial institution customers by rerouting to an adjustments team. Inquiry files containing MICR data for a plurality of presented items are evaluated by a duplicate detection module. Each item presented is evaluated against all previous items based on its MICR line. Unique items are processed in the usual manner. Duplicate suspects undergo further processing. Suspects having identical MICR data, but that are not duplicates, such as NSF (non-sufficient funds) checks being re-deposited, are identified and posted. The remaining suspects go in the suspect queue of a case management system. After being researched, suspects found not to be duplicates are posted. The remaining suspects are flagged as duplicates and routed to an adjustor for further action.

By the 1950's, the volume of financial instruments, such as checks, being processed by financial institutions led to a demand for an approach to automated check processing based on the developing technology of automated data processing (ADP). One aspect of this automated approach was the use of magnetic ink character recognition (MICR) printing, using a specially-designed computer-readable font, to encode check information within a predetermined area on the face of the financial instrument. The MICR print area with the encoded check information has come to be known as the "MICR line." In addition to the integers 0-9, the font includes additional symbols, typically symbols to indicate "transit," "amount," "on-us" and "dash."

Figure 1:
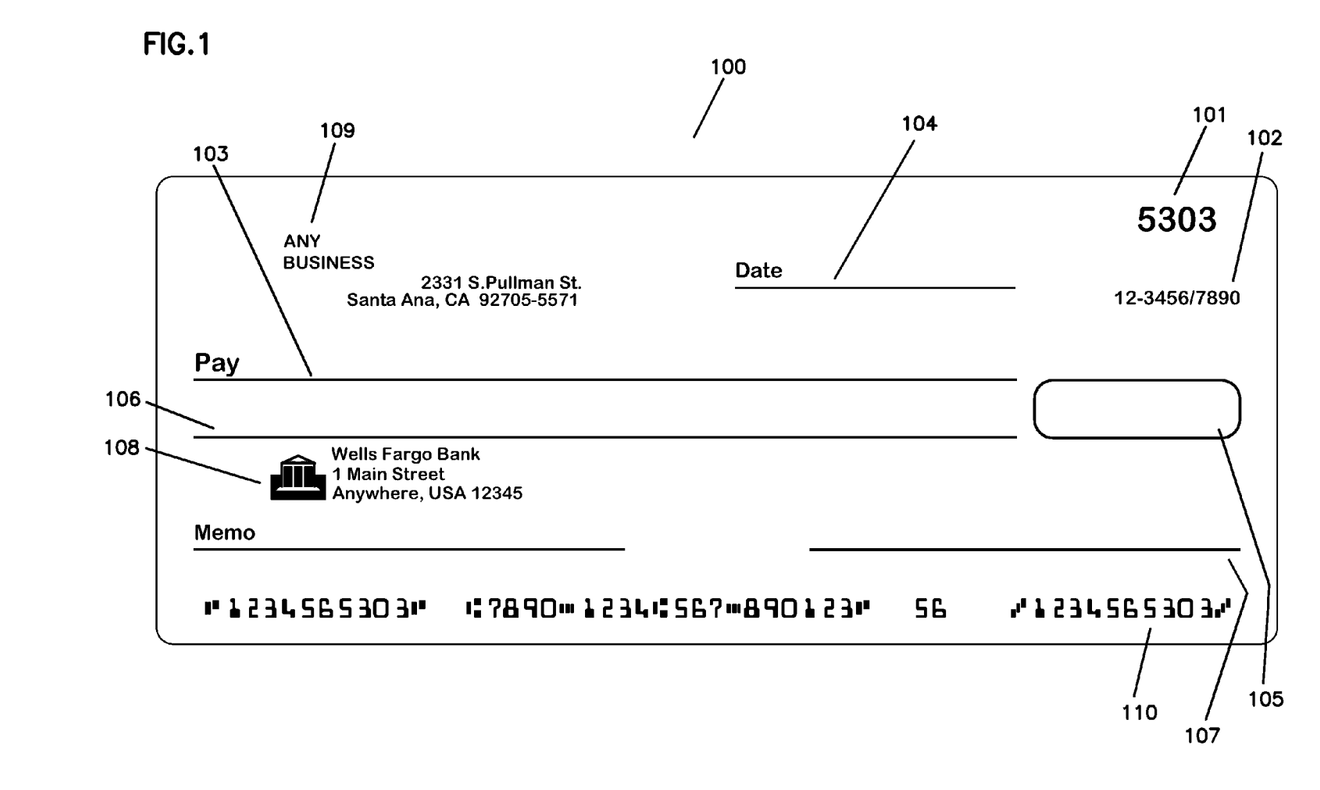
FIG. 1 shows an image of a personal check with a MICR (magnetic ink character recognition) line.

FIG. 1 shows an image of an exemplary check 100 that includes a MICR line 110. Additionally, a financial instrument, such as a check, may contain at least one or more of the following features:

check number 101;
fractional routing area 102;
payee 103;
date 104;
convenience amount field 105;
legal amount area 106;
signature 107;
bank name, address and, usually, logo 108; and
accountholder information.

The ordinarily-skilled practitioner will readily recognize that electronic instruments possess features that are completely analogous to the foregoing check features.

Figure 2:
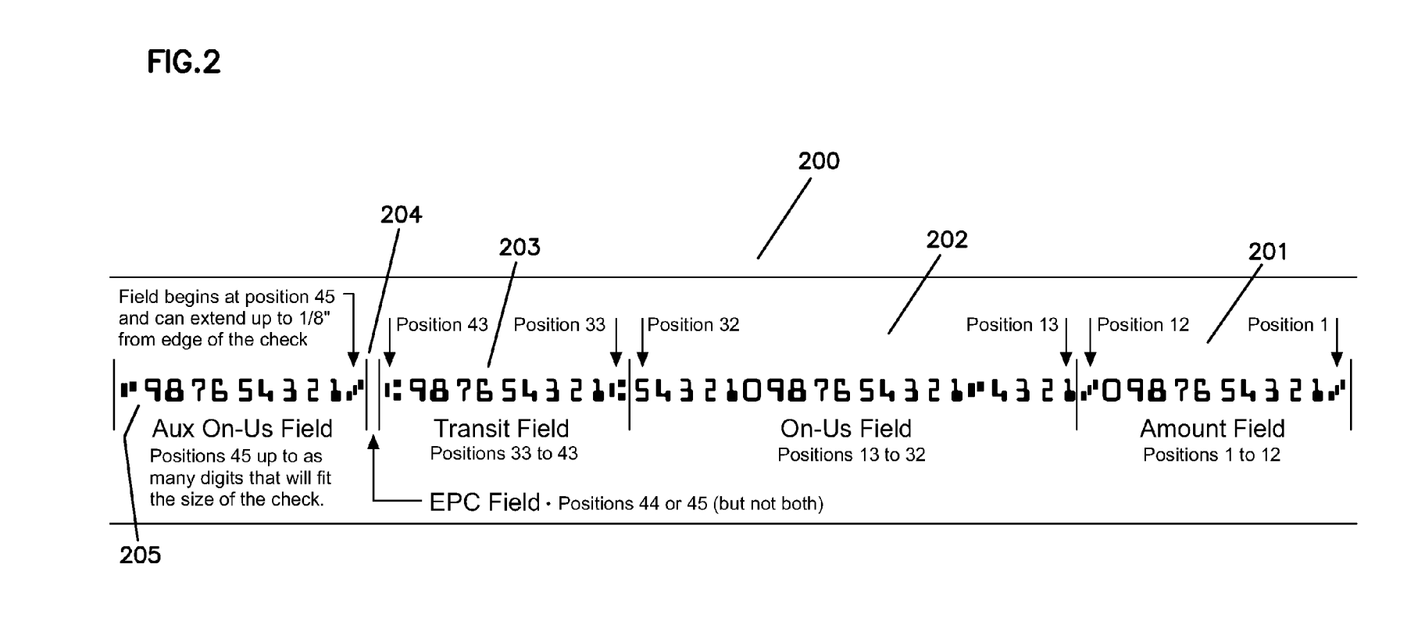
FIG. 2 shows a detailed diagram of the MICR line from a financial instrument.

Turning now to FIG. 2, shown is a MICR line as it typically appears on a financial instrument, such as a check. The MICR line typically includes a plurality of fields such as:

an amount field 201;
an on-us field 202;
a transit field 203;
an external processing field 204; and
an auxiliary on-us field 205.

The amount field 201, typically occupying positions 1-12 of the MICR line, is not normally printed by the check supplier. This field is used for processing the check and is coded after the check is drawn in the post-encoding process at the bank of first deposit.

The "on-us" field 202 typically occupies positions 13-32 of the MICR line and is normally used for account number information, bank identification, check numbering or other special codes. An "on-us" symbol appears to the right of the last account number digit. The four characters to the right of the on-us character (positions 13-16) are reserved for special bank use.

The transit field 203 is sometimes referred to as the routing field and occupies positions 33-43 on the MICR line. The routing field is reserved for the combined transit and routing codes used to direct the check as it passes through the system.

The EPC (external processing code) field 204 is a one-digit field occupying either of positions 44 or 45 of the MICR line. This field is reserved for uses specifically authorized by the ASC (Accredited Standards Committee) X9.

The auxiliary "on-us" field 205 usually contains the check serial number, and it may also contain accounting control information specific to that account. This field is usually only present on large-format business checks.

Many different payment types including paper checks are submitted to modern financial institutions over a variety of payment channels. IRDs (image replacement documents), or substitute checks are created from paper checks and may be processed in lieu of the paper check. There also exist a variety of image exchange and image share channels along which image files are transmitted, shared and exchanged. Even though the MICR line was originally placed on paper checks, the various types of non-paper, such as images and ACH transactions, still bear electronic analogues of the MICR line, containing substantially the same data in the same format, which uniquely identify the financial instrument. Because the MICR data uniquely identifies a financial instrument or transaction, it can be used in a cross-channel duplicate detection system to identify duplicate financial instruments across the various channels within the payment stream.

There exist a variety of payment scenarios that carry a high probability of leading to duplicate instruments entering the payment stream. A system for cross channel duplicate detection provides the capability of identifying these duplicate items, removing them from the payment stream and directing them to centers for special processing. Common duplicate detection challenges may include:

- detection of duplicate items presented through new image exchange/image share channels;
- detection of duplicates received through IRD/paper channels including items from branch item truncation systems, inclearings and returns;
- detection of duplicate transit items;
- detection of duplicate items presented through the ATM (automated teller machine) channel;
- detection of duplicate items between channels such as check conversion to ACH (cross channel detection); and
- the ability to accomplish the foregoing within Day 1.

The above listing is not meant to be exhaustive or all-inclusive. Other duplicate detection challenges will occur to the ordinarily-skilled practitioner which the presently-described system is capable of resolving.

Figure 3:
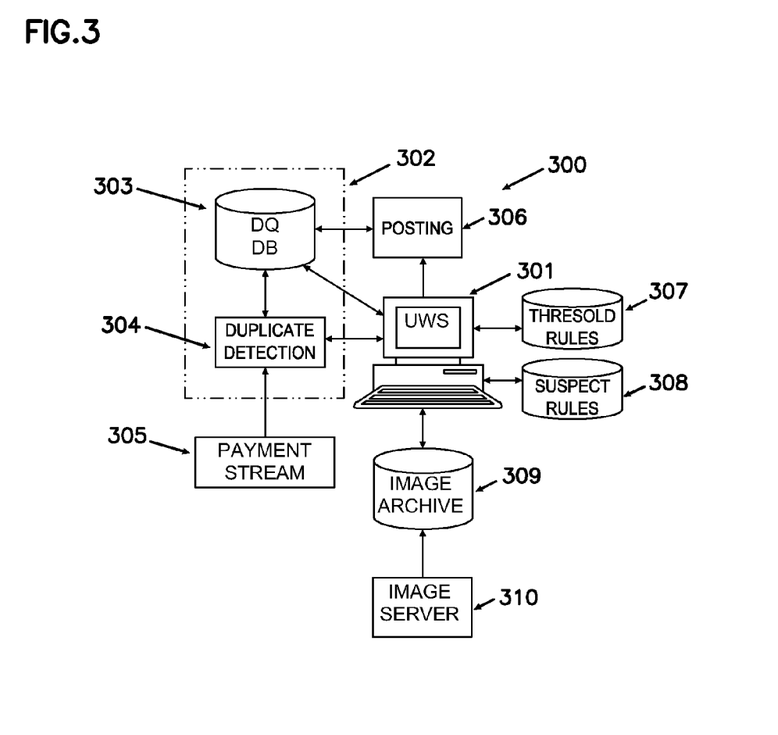
FIG. 3 shows a block diagram of a system for MICR-based duplicate detection and management.

Turning now to FIG. 3, shown is a high-level diagram of a MICR-based system for duplicate detection 300. In overview, the system 300 may include at least the following elements:

- A case management system (universal workstation or UWS) 301;
- a duplicate detection module 302;
- a posting module 305; and
- one or more rule bases 307, 308.

Figure 7:
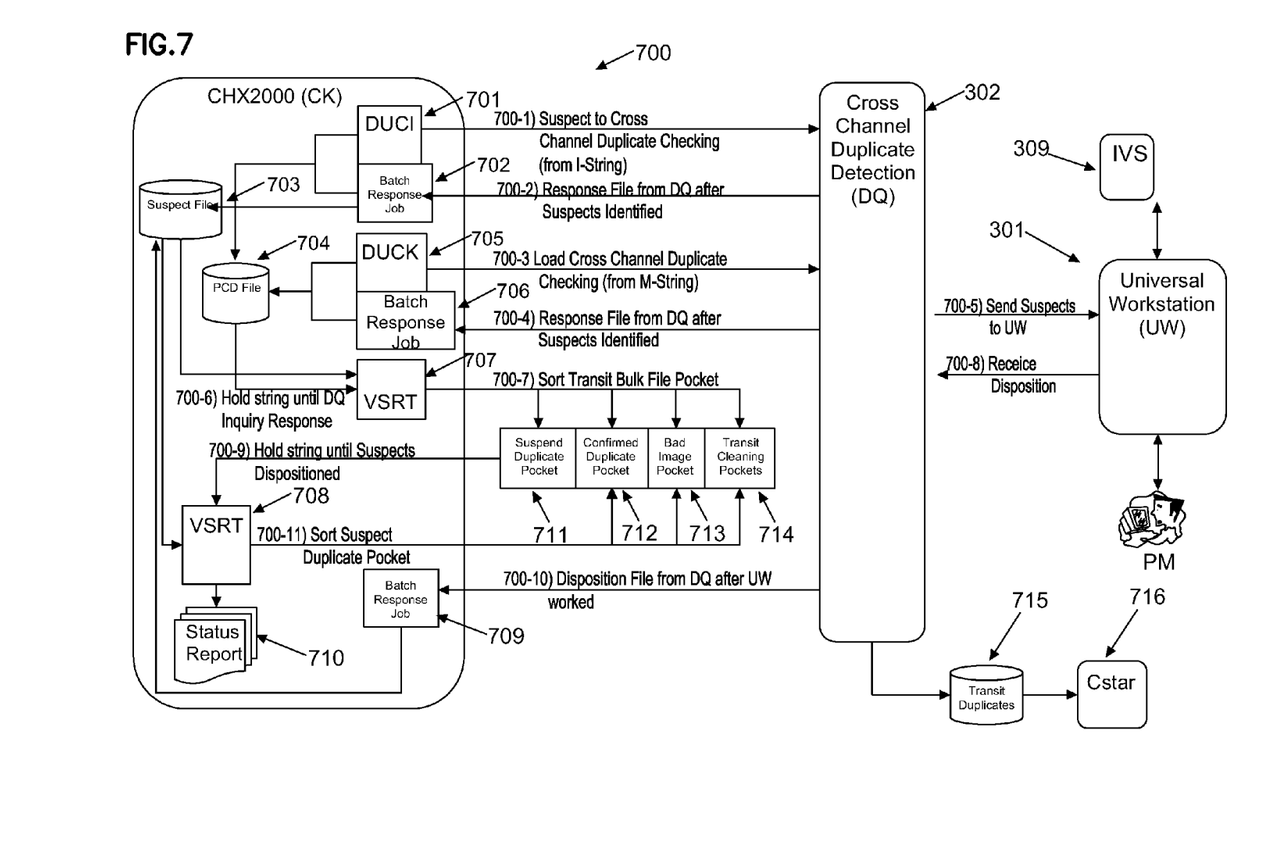
FIG. 7 shows a more detailed diagram of the system of FIG. 3, also showing handling of duplicate transit items.

Additionally, the system 300 may include at least one image server 310 and at least one image archive 309. A more detailed diagram of the system is shown in FIG. 7, which is described and discussed further below. As indicated in FIG. 3 by the arrows establishing connections between the elements of the system, the separate elements are communicatively coupled to each other.

Figure 5A:
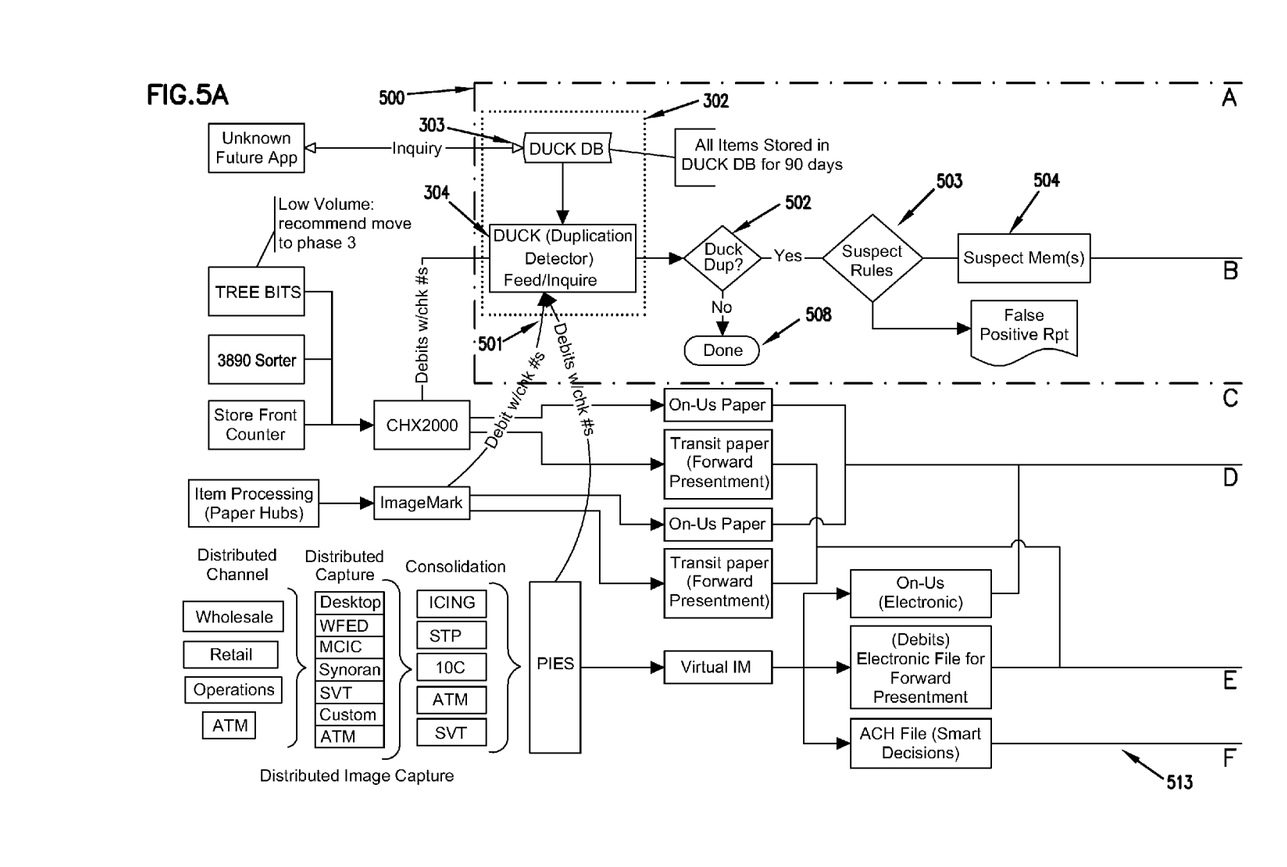
FIGS. 5A and 5B show a flow diagram of a method for identifying and managing duplicate deposit items.
Figure 5B:
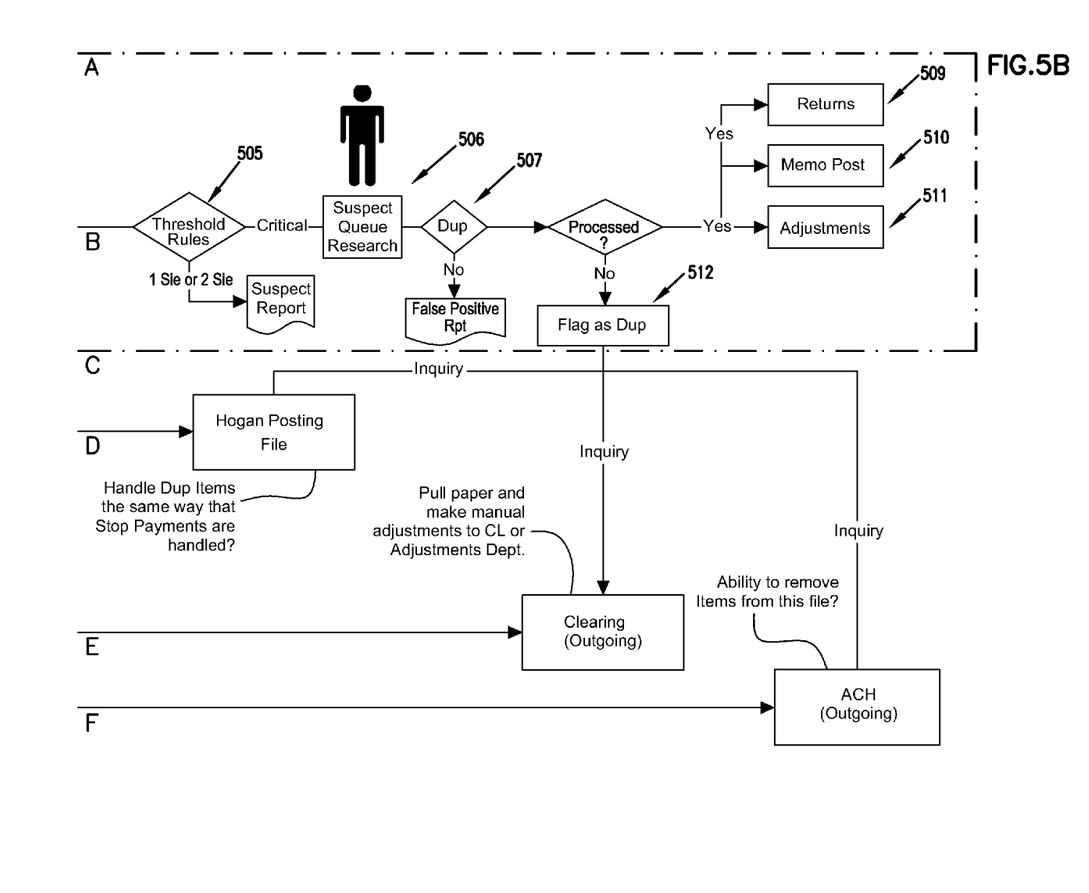
Figure 6A:
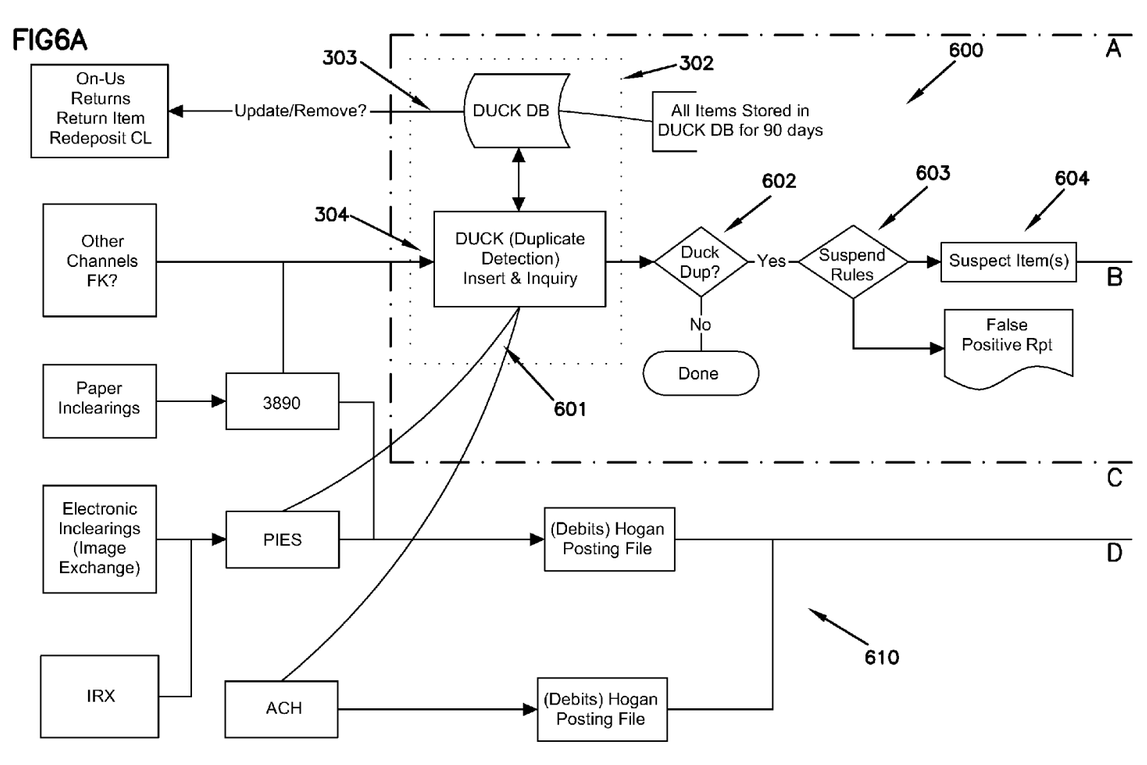
FIGS. 6A and 6B show a flow diagram of a method for identifying and managing duplicate inclearings.
Figure 6B:
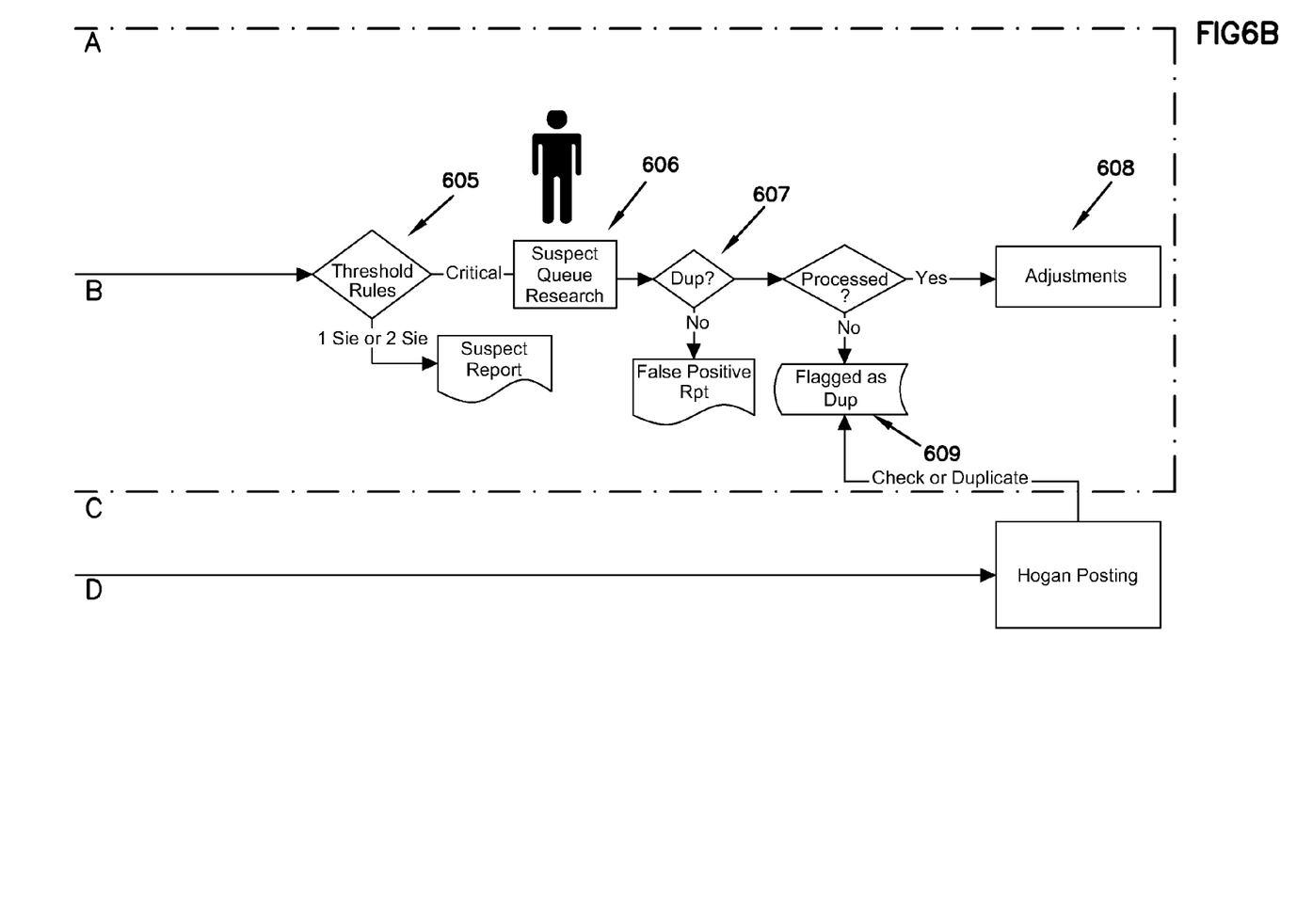

The MICR data of a payment stream 305, typically including items from a number of channels, is processed by the duplicate detection module. The ordinarily-skilled practitioner will appreciate that the various embodiments of the system and method described herein utilize the MICR data corresponding to the items, rather than the actual items, to identify duplicate items. As shown in FIGS. 5-7, the items themselves are handled in a conventional manner according to conventional banking practices. However, items that are confirmed to be duplicates, based on analysis of their MICR data, are removed from the payment stream, with the result that only unique items remain in the payment stream. The items removed from the payment stream are subjected to additional processing, such as fraud evaluation and adjusting.

Data files (known hereinafter as "inquiry files") containing the MICR data of all items in the payment stream are forwarded to the duplicate detection module 302. In one embodiment the duplicate detection module includes a DQ database 303, wherein the MICR data of each item is stored, and a duplicate detection component 304, communicatively coupled with the DQ database 303, that compares the MICR data of each item received with the MICR data of all items received previous to the first item and stored in the DQ database 303. More will be said about the approach taken to compare the MICR data below. A variety of enterprise DBMSs are suitable for creation and management of the DQ database 303. One embodiment is based, for example on DB2 ((INTERNATIONAL BUSINESS MACHINES CORPORATION, Armonk, N.Y.). In one embodiment, the duplicate detection module 302 is hosted on a mainframe computer, such as such as a SYSTEM Z (INTERNATIONAL BUSINESS MACHINES CORPORATION). Other software/hardware combinations will occur to the ordinarily-skilled practitioner. The duplicate detection component 304 of the duplicate detection module 302 may constitute a processor programmed to detect duplicate items based on analysis of their MICR data, as described in greater detail below.

The primary function of the universal workstation 301 is case management of the processing of suspect duplicates. Thus, the universal workstation is alternatively referred to herein as a "case management system." In one embodiment, the universal workstation 301 may be a workflow management software application executing on a server or other such computational device. Duplicate candidates are initially identified by the duplicate detection component 304. Items identified as being unique from analysis of their MICR data are allowed to remain in the payment stream and post. Items identified as duplicates, at this early stage of the process are classed as suspect duplicates. As described below, the suspect duplicates undergo several further processing steps before they are finally disposed of either as duplicates or unique items. Much of this process involves the management of a number of queues that the MICR data of the suspects is placed into for processing. It is the universal workstation that routes the suspects from one queue to another and manages the queues. Additionally, when a suspect duplicate item is confirmed to be a duplicate, the universal workstation flags the item as a duplicate in the DQ database 303.

The rule bases 307 and 308 include sets of business rules against which suspect duplicates are evaluated during the process of separating confirmed duplicates from unique items. The suspect rule base 308 preferably includes one or more exclusionary rules that eliminate certain items from the set of suspects that may have the same MICR data, but are not considered duplicate items. For example, certain items may always be presented with the same MICR line, such as coupons, vouchers, serial numbers populated with the check creation date, etc., but that are not duplicate items. It is this type of item that the exclusionary rules of the suspect rule base 308 may be used to detect and remove from the set of suspects.

Inquiry files containing large numbers of suspects—known hereinafter as "large" cases—are preferably processed differently from inquiry files containing smaller numbers of suspects—known hereinafter as "small" cases. The threshold rule base 307 includes at least one business rule against which each case is evaluated to determine if it is a large case or a small case. More will be said about the processing for large and small cases herein below.

In one embodiment, the posting module 306 constitutes a processor programmed to post items presented for payment. Typically, a payment processing application, such as the Hogan Integrated Deposits System (COMPUTER SCIENCES CORPORATION, Austin, Tex.), is hosted and executed on a mainframe computer such as a SYSTEM Z (INTERNATIONAL BUSINESS MACHINES CORPORATION). The foregoing description of software and hardware is only intended as an example. Other software/hardware combinations may occur to the ordinarily-skilled practitioner and are within the scope of the claims attached hereto.

Items that are determined, as a result of comparison of their MICR data with the MICR data of all items stored in the DQ database 303, are confirmed as duplicates by visually comparing an image of the suspect with an image of the original item on the universal workstation 301. Images of the underlying financial instruments are captured at various points on a variety of payment channels, some within a financial institution and others, at distributed locations. The system may include at least one image server 310 at an image capture point for accumulation and short-term storage of the captured images. In turn, the image server may route images to an image archive 309 for long-term storage. In one embodiment, the universal workstation 301 may retrieve images for comparison from the image archive 309.

While the various modules and components of the system are shown as discrete units, a variety of system configurations are possible. For example, the system may include a plurality of discrete computing devices communicatively coupled to each other, each computing device hosting and executing one or more software applications that carry out the particular function of one of the modules. In another embodiment, the system may encompass a single mainframe computer hosting a plurality of separate modules corresponding to those shown and described above. Other software/hardware configurations are possible. All are within the scope of the claims attached hereto.

Figure 4:
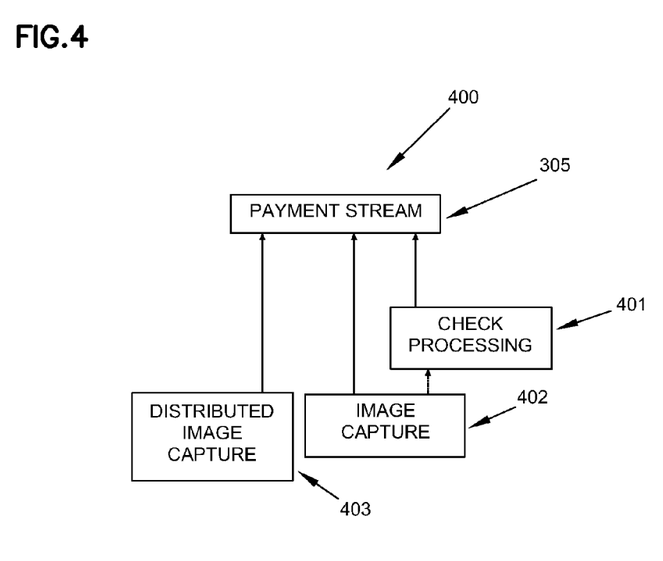
FIG. 4 shows a block diagram of a posting stream that includes multiple channels.

As previously described, inquiry files containing MICR data for each item in a payment stream 305 are routed to the duplication detection module 302. The payment stream itself may include items received over a number of channels. Referring now to FIG. 4, a diagram 400 of an exemplary payment stream 305 is shown. As indicated above, a variety of channels within the stream are possible. The exemplary payment stream shown includes at least: a check processing channel 401, a local image capture channel 402 and distributed image capture channel 403. The ordinarily-skilled practitioner is reminded that the payment stream 305 routed to the duplication detection module 302 constitutes inquiry files containing MICR data identifying each item in the stream. As described below, the actual items move through the processing system via a separate route.

A check-processing channel 401 typically includes paper checks and similar instruments that, in fact, have not been imaged and will be processed and posted without being imaged. In one embodiment, the check-processing channel 401 receives paper checks that have been presented to the financial institution for payment. The checks are typically processed through a document sorter, such as an IBM (INTERNATIONAL BUSINESS MACHINES CORP.) 3890 series document processor. In one embodiment, the document processor captures the MICR data encoded on each item, usually along the bottom edge of the item. While the term "MICR data" has been used herein to denote the encoded information that uniquely identifies a financial instrument, in actual fact, the data may be read from the instrument by magnetic ink character recognition (MICR) or optical character recognition (OCR) or any other character recognition technology. After the MICR data is captured by the document processor, it is received by a check processing control system (CPCS)—typically a software application hosted and executing on a computing device such as a mainframe computer. In one embodiment of the invention, the CPCS software is hosted on the same mainframe computer as the duplicate detection module 302 and the posting module 306. However, other software/hardware configurations may occur to the ordinarily-skilled practitioner. All are within the scope of the claimed subject matter. In one embodiment, the CPCS software may be a custom, proprietary application. In another embodiment, the CPCS may be an externally-produced application supplied by a vendor of CPCS software. It is a role of the CPCS software to format the received MICR data into one or more inquiry files, which are then forwarded to the duplicate detection module 302. As shown in FIGS. 5 and 6, an inquiry file 501 generally contains at least item numbers and debits.

A check processing system 401 may also include an image capture processor (ICP) that optically scans the check to generate an image of the front and back of the check. The check images are then routed to an image server 310, eventually to be stored in an image archive 309. Under Check 21, as of October, 2003, printouts of these images, also known as IRDs (image replacement documents), rather than the physical checks, can be used when institutions need to exchange check information.

Large financial institutions may have several regional check processing centers, often known as hubs, each of them equipped with at least one document sorter for processing checks and other paper instruments. In such an embodiment, the payment stream 305 will include inquiry files containing the output of each of these hubs.

The check processing channel 401 may also include the output of one or more branch item truncation systems (BITS). The output of a BITS may include both paper items from branch locations of a financial institution and images of paper items that have been captured at the branch location. One of ordinary skill will recognize that the branch item truncation system is intended to facilitate processing of paper checks and the paper items that are associated with checks such as deposit slips and cash-in and cash-out slips. While a portion of such items can be truncated (imaged) at the branch, other items are not imaged and the actual paper items are processed. Thus, the output of a branch item truncation system is typically a combination of paper and images. The MICR data of items originating from a BITS is captured in the manner previously described and presented to the CPCS for inclusion in an inquiry file.

A second example of a channel contributing to the payments stream 305 is a local image capture channel 402. Typically, a local image capture channel 402 comprises paper items that have been imaged and it is the image, rather than the item itself, that is processed. As shown in FIGS. 5A, 5B and 6A, 6B, the paper items are received at paper processing hubs and processed through an image capture module, typically a computational device hosting and executing an image capture software application. In one embodiment, the image capture module captures the MICR data from the imaged items, formats the MICR data into one or more inquiry files and routes the one or more inquiry files to the duplicate detection module 302. As shown in FIGS. 5A, 5B and 6A, 6B, the image of the item, rather than the item itself is processed through the item route 517. One of ordinary skill will recognize that images are also deposited in the image archive 309. In an additional embodiment, as shown in FIG. 4, the captured MICR data, rather than being formatted into inquiry files by the image capture module, is instead routed to the check processing module 401, where it is then formatted into inquiry files and enters the payment stream 305 being directed to the duplicate detection module 302.

An additional example of a channel contributing to the payments stream 305 is a distributed image capture channel 403, actually including various sub-channels: wholesale, retail, operations, and ATM (automated teller machine), for example. In large financial institutions, such as WELLS FARGO BANK (San Francisco, Calif.), in addition to centralized item processing hubs, items may be received at a variety of other distributed locations, for example different types of wholesale or retail locations, operations (internal to the financial institution) and ATM (automated teller machines). Some of these locations may be within the financial institution and others associated, for example with customers or business partners of the financial institution. For example, while ATMs have long been capable of accepting paper checks for deposit, the newest generation of ATMs has an image capture capability, wherein, when a customer deposits a paper item, such as a check, the ATM captures an image of the check. Subsequently, the image of the check is processed and presented for payment.

Some financial institutions, at branches, provide automated terminals—store vision tellers—for transactions that have conventionally been performed by human tellers, such as remittances. More and more teller transactions at branch locations of the financial institution involve capturing an image of the financial instrument and processing the image. Such images are captured at the location and typically directed to one or more consolidation facilities and directed into the payment stream by one or more modules that sort and review the images, capturing the MICR data from the images and directing it to the duplication detection module 302. As above, a copy of the image is directed to the image archive 309. Additionally, the image is processed and presented for payment in a conventional manner 516.

The foregoing description of payment channels is not intended to be limiting. Other embodiments are possible wherein items are received for presentation and payment via a variety of channels.

Turning now to FIGS. 5A, 5B, a diagram is shown of a computer-implemented process 500 for identifying and removing duplicate deposit items—items deposited at the bank of origin. As previously described, inquiry files 501 containing the MICR data for the items are directed to the duplicate detection module 302. The MICR data for each item in an inquiry file contains at least the check no. and the debit amount. Upon receipt of the inquiry file, the MICR data for each item is compared with the MICR data for each item previously stored in the DQ database 303. As the inquiry files are presented to the duplicate detection module 302, the MICR data for each item is stored in the DQ database. In an exemplary embodiment, items are stored for ninety days. However, other periods of time may be dictated by business and legal requirements.

To identify duplicates, the MICR data contained in the incoming inquiry files is compared with the MICR data saved to the DQ database. The ordinarily-skilled practitioner will understand that the MICR data is organized in the DQ database to correspond to separate items or transactions. In one embodiment, a signature, such as a hash, is computed for each item. A variety of hashing algorithms will be known to the ordinarily-skilled practitioner. A variety of conventional hashing algorithms are suitable for hashing the MICR data. The hash of each item evaluated is compared with the hash of each item previously stored in the DQ database 303. In one embodiment, comparison of the MICR data is done by direct comparison of the raw data. In other embodiments, the signature may constitute a digest or similarity measure computed for each item using known methods.

If two items are found to have the same MICR data, either as a result of direct comparison or because of a collision between two hashes or digests, the later-presented item may be classified as a "suspect." That is, it is suspected of being a duplicate of the earlier item. If an item is determined to be unique, the MICR data for that item undergoes no further processing 508. The underlying item may be permitted to undergo conventional processing 512 and to pass to the posting module 306 for posting.

Following this, the suspects may be evaluated 503 against the suspect rules 308. As above, the suspect rule base contains one or more exclusionary rules to identify false positives—that is, items that have the same MICR data but are not duplicates, such as coupons, vouchers and items with the serial number populated with the check creation date, etc., but that are not duplicate items. False positives, again, are allowed to undergo conventional processing and to pass to the posting module 306 for posting. In one embodiment, the false positives may be written to a false positives report.

After false positives are removed, the suspects 504 are evaluated 505 against the threshold rule base 307. Evaluation against the threshold rules reveals whether an inquiry file contains more than a threshold number of suspects.

In one embodiment, the threshold rules include at least the following rules for determining whether a file is a small case, containing a relatively small number of suspects, or a large case:

Greater than or equal to 99% of the items in the file are suspects;

Greater than or equal to 50 sequential items are suspects; and

Greater than or equal to 100 items in the file are suspects.

Any inquiry file that exceeds one of the thresholds may be determined to be a large case, meaning that the file contains a large number of suspects. The actions that may be taken with large case files are:

mark all items in the file as duplicates;

mark one or more ranges of items in the file as duplicates; and mark all suspects as duplicates.

Large cases are then sent to the suspect queue of the universal workstation 301 for research 506. When a large case is researched on the universal workstation 301, a particular selection of the suspect items in the case is typically examined. Examination may involve retrieval of the images of the suspect items and the original items and examining the suspect image and the original image side-by-side in order to determine if they are, in fact, duplicate items. In order to examine the selection of suspect items in the case, the images are retrieved from the image archive 309. As described below, an image retrieval module retrieves the image from the image archive 309. In one embodiment, inspection of the images is performed by a human operator, as indicated in FIG. 5. In another embodiment, inspection may be performed by an image analysis module, for example a computational device programmed to perform a side-by-side analysis of the images.

Small case files, containing less than a threshold number of suspects are also sent to a suspect queue of the universal workstation 301 for research. In small cases, individual suspects are evaluated. Again, examination is performed by comparing images of the suspect and the original item side-by-side, wherein the images are retrieved from the image archive 309.

After the suspect items are reviewed, a disposition is made of each suspect item 507. In one embodiment, each suspect is disposed of as either "duplicate," "non-duplicate," or "indeterminate." Other disposition categories may occur to the ordinarily-skilled practitioner and are within the scope of the invention. Suspects are typically disposed of as indeterminate when the image of the item is either unavailable or of such poor quality that it cannot be evaluated. In one embodiment, "indeterminates" are processed in the same manner as non-duplicates. That is, they are submitted for posting. In another embodiment, the "indeterminates" may be forwarded to another business unit for further processing to resolve their status. As items are disposed of, their status may be updated 512 in the DQ database 303. In the case of non-duplicates and indeterminates, no update is necessary. In the case of duplicate items, the duplicate items are marked as duplicates 512 in the DQ database 303. Before posting an item, the posting module 306 checks the item record in the DQ database 306 and only posts those items that are not flagged as duplicates. Additionally, the underlying item is removed from the posting stream In one embodiment, all confirmed duplicate items are next routed to a Return Item/Fraud review module. These items are reviewed for fraud before being sent to adjustments.

Within the Return Item/Fraud review module, large cases preferably are routed to an auto-adjust queue that is directly sent to a business unit responsible for making adjustments 511. The remaining confirmed duplicates identified from small cases may be routed to a fraud control business unit for review to determine whether or not they are fraudulent instruments. Items determined to be fraudulent may be retained in the fraud control unit for investigation and disposition. Non-fraudulent items may then be routed to the business unit responsible for adjustments 511.

Situations may exist wherein an item may be posted, even though it was marked as a confirmed duplicate. In the event of such occurrence, a day 2 process creates an automatic reversal to the customer account involved, and forwards the item to the business unit responsible for adjustments 511.

All duplicate debits, such as returns 509 and memo posts 510, need to be reversed. Items on the customer's account may have been routed to Return Items 509 as a result of an overdraft caused by payment of the duplicate item. Return Item fees need to be reversed for these items and the items resubmitted for payment.

When an account's status is "memo-posted," it means that the financial institution has temporarily recorded a credit or charge to the account so as to update the balance in a "batch posting" environment. Typically, within the present context, the items will have hard posted (debited) to the customer's account. However, it is possible that a memo post 510 may show up as a duplicate debit, in which case, it will need to be reversed. Duplicate debits may be reversed by the following scrub process:

Items that are being returned through various applications, such as paper returns, ACH returns, image returns and so on, have a high probability of being re-presented for payment a second time. If the DQ is not updated in some way to reflect that such items had been returned, the items would be identified as suspect duplicates when returned. In order to avoid duplicate debits, any application that processes return items may send a scrub file to DQ, listing the debit that is to be reversed. DQ recognizes the scrub file as a distinct inquiry file type and thus, a scrub file is never confused with the inquiry file type—a load file—sent to populate the DQ database. DQ processes the scrub file by locating the originally presented item in the database (by full MICR line) and decrementing the count on that item. For example if an item had been presented once and returned, the count on the item would be decremented to zero so that if the item were re-presented it would be incremented to one all over again. Because the item's count is one, in spite of having been presented more than once, the item is not identified as a suspect duplicate item.

The foregoing sequence of processing steps is illustrative only, and is not intended to be limiting. Other embodiments may involve more or fewer steps than those described above. Additionally, the steps described above may occur in different orders than described. Other approaches may occur to the ordinarily-skilled practitioner. All are within the scope defined in the attached set of claims.

Referring now to FIGS. 6A, 6B, shown is a process 600 for identifying and removing duplicate inclearings—items deposited at a bank other than the bank of origin and presented by the bank of origin for payment. The ordinarily-skilled practitioner will readily recognize that the process 600 for identifying duplicate inclearings is a close analog to the process 500 for deposits. Inquiry files 601 are directed to the duplicate detection module 302 through a variety of payment channels. The MICR data contained in the inquiry files is stored in the DQ database and undergoes evaluation 602 by the duplication detection component 304 in the same manner as deposits. Unique items 611 undergo no further processing and the underlying instrument goes through conventional processing 610 to posting by the posting module 306. Suspects are evaluated against the suspect rules 603 to identify false positives. The false positives are allowed to post. The remaining suspect items 604 are evaluated against the threshold rules 605 to identify large cases and small cases. Both large cases and small cases are researched 606 as described above. Confirmed duplicates 607 are flagged as duplicates 609 in the DQ database 303. The posting module 306 makes calls to the DQ database to determine if an item is flagged as a duplicate. If so, it does not post the item, and the item is removed from the posting stream. On the other hand, false positives and indeterminate items are allowed to post. Confirmed duplicates are directed to adjustments 608 for further processing.

Referring now to FIG. 7, shown is a method 700 for identifying and removing duplicate transit items from a payment stream. In one embodiment the method preferably applies to transit items that are cleared as images or IRDs, with items cleared as paper being unaffected by the process. In overview, the method involves one or more of the image capture applications previously described sending an inquiry file to the duplicate detection module. Sorting of these items to send to their paying banks is delayed until suspect duplicates have been identified. The duplicate detection module uses the inquiry file to search the DQ database for duplicate items. If suspect duplicate items are identified, the items are sent to a re-handle pocket where they are held until a disposition is made in Universal Workstation. If they are confirmed as duplicates they are sent directly to Adjustments. Otherwise, they are released from the re-handle pocket, sorted to their payment endpoint and sent for forward collection.

Referring now to FIG. 7, a module 701 within one of the applications that direct inquiry files to the duplicate detection module, as shown in FIGS. 3 and 4, for example, a check processing application 401 directs a preliminary suspect inquiry file 700-1 to the duplicate detection module 302. At the same time, a file is created in the process control database (PCD) 704 to track the inquiry file and the response file received from the duplicate detection module 302. In one embodiment, the PCD 704 contains the logic that controls how items are to be sorted, and whether or not VSRT (707, 708) should run, based on the inquiry file and receipt of a response file from the duplicate detection module 302. The duplicate detection module returns a response file 700-2 with suspects identified.

It is to be appreciated that the steps 700-1 and 700-2 constitute a first pass through the inquiry file and that the inquiry file is subject to further processing as described herein below. Because an aim of the first pass is the preliminary identification of suspect transit items, it will be appreciated that, at this time, no update need be made to the DQ database 303, and none of the identified suspects are sent to the universal workstation 301 (UW) for investigation or research. One of ordinary skill will recognize that preliminary identification of suspect transit items is desirable in order to promptly remove confirmed duplicates from the processing stream. Although the primary aim of the first pass is early identification of suspects, it is possible that some items may be disposed of as a result of the first pass, without being investigated at the universal workstation 301.

Preferably, a batch processing module 702 writes suspects from the response file to a suspect file 703. In one embodiment, the system may include logic that allows the check processing system 401 to indicate if items should be released to the virtual sorting process (VSRT) 707.

VSRT 707 in turn, includes logic that delays item sort until it receives a message indicating that the first pass transit suspect identification is complete.

Once updating to the suspect file 703 is complete and the string has been released to VSRT 707, VSRT sorts the transit bulk file to a number of pockets, according to item status. VSRT first sorts any items for which the image has been determined to be a bad or faulty image to the bad image pocket 713. The underlying item is removed from the stream and sent to a bad image endpoint.

Suspect items are sorted to a new suspect duplicate pocket 711. If a transit item has, for any reason, already been disposed of as a confirmed duplicate, it is sorted to a confirmed duplicate pocket 712. Otherwise, unique items are sorted to the appropriate transit clearing pocket 714. One of ordinary skill in the art will appreciate that VSRT employs a conventional virtual sorting process, wherein a stream of unsorted data objects do not undergo physical sorting. Rather, the items, without actually being sorted, are mapped to any of a number of different pockets based on some indicator of type or status by means of pointers.

In a second pass, a component 705 of the check-processing system 401 loads the duplicate detection module 302 with balanced file data 700-3. As in the first pass, the duplication detection module 302 returns a response file 700-4 after suspects are identified. After the second pass, suspects are sent to the universal workstation 301 for research and eventual disposition 700-5.

The response file, received by a batch processing component 706 is then processed in the same manner as the response file from the first pass. That is, it is used to update the suspect file 703 and is then passed to VSRT 707. The response file is held 700-6 until confirmation that suspect identification is complete. The transit bulk file is then sorted 700-7 in the same manner as after the first pass—with items being sorted to one of the pockets 711, 712, 713 and 714.

As items are researched and disposed of at the UW 301, the duplicate detection module 302 receives reports of the disposition 700-8 of each item. As previously described, as a result of the first and second pass, items identified as suspects are sorted to the suspect duplicate pocket 711. At this stage, until items in the file have had their disposition reported and updated in the suspect file, VSRT 708 holds the file.

After all suspects for a particular inquiry file have been dispositioned in UW 301, the duplicate detection module 302 issues a disposition file 700-10 to the check processing system 401, which is received by a batch processing module 709, reporting the dispositions of each of the identified suspects. Based on the disposition file, the check processing system 401 updates the suspect file 703 with the disposition of each suspect item.

After the suspect file is updated, VSRT 708 proceeds to sort the suspect duplicate pocket 711. VSRT uses the reported disposition to determine whether the original suspect item should be sorted to the confirmed duplicate pocket 712 to be forwarded to the confirmed duplicate endpoint or one of the transit clearing pockets 714, to be forwarded to a forward presentment endpoint indicated by the sort pattern. A file of confirmed transit duplicates 715 may then be forwarded to an adjustments business unit 716, wherein credits may be reversed and customers adjusted by the adjustments business unit.

The ordinarily-skilled practitioner will readily appreciate the importance of day 1 removal of duplicate transit items from the payment stream. To this end, the check processing application 401 may include logic that permits forcing transit suspects to be sorted without a disposition status having been reported by the duplicate detection module 302 or the universal workstation 301. In one embodiment, such forcing is done if a disposition status for a suspect has not been received by a predetermined time of day, for example, close of business or by midnight. In another embodiment, suspects can be manually sorted, by entry number, for example.

Figure 8:
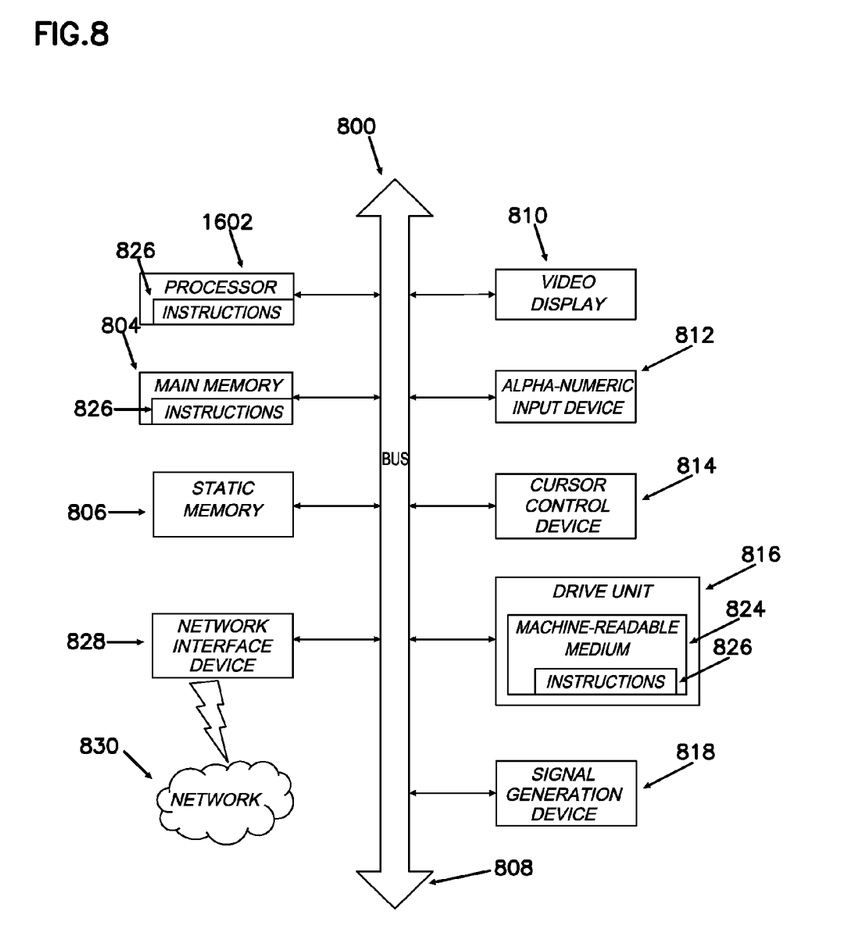
FIG. 8 shows a diagrammatic representation of a machine in the exemplary form of a computer system within which a set of instructions for causing the machine to perform any one of the methodologies herein described to be executed.

FIG. 8 shows a diagrammatic representation of a machine in the exemplary form of a computer system 800 within which a set of instructions for causing the machine to perform any one of the foregoing methodologies may be executed. In alternative embodiments, the machine may comprise a network router, a network switch, a network bridge, personal digital assistant (PDA), a cellular telephone, a web appliance or any machine capable of executing a sequence of instructions that specify actions to be taken by that machine.

The computer system 800 includes a processor 802, a main memory 804 and a static memory 806, which communicate with each other via a bus 808. The computer system 800 may further include a display unit 810, for example, a liquid crystal displays (LCD) or a cathode ray tube (CRT). The computer system 800 also includes an alphanumeric input device 812, for example, a keyboard; a cursor control device 814, for example, a mouse; a disk drive unit 816, a signal generation device 818, for example, a speaker, and a network interface device 820.

The disk drive unit 816 includes a machine-readable medium 824 on which is stored a set of executable instructions, i.e. software, 826 embodying any one, or all, of the methodologies described herein below. The software 826 is also shown to reside, completely or at least partially, within the main memory 804 and/or within the processor 802. The software 826 may further be transmitted or received over a network 828, 830 by means of a network interface device 820.

In contrast to the system 800 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A computer-implemented method for identifying duplicate items presented for payment before final posting comprising of the steps of:
   computing a signature of a first item presented for payment from the first item's magnetic ink character recognition (MICR) data;
   comparing, by a computing device, the signature of the first item presented for payment with a signature of a second item presented for payment:
      when the signatures are not the same, posting both items; and
      when the signatures collide, designating at least the first item a suspect;
   processing the suspect to confirm that the suspect is a duplicate item;
   when the suspect is confirmed to be a duplicate item, preventing the suspect from being posted; and
   when an inquiry file contains at least one suspect that is not determined to be a false positive, evaluating said inquiry file against a rule base comprising at least one threshold rule:
      when said inquiry file contains more than a threshold number of suspects that are not false positives, directing said inquiry file to a first suspect queue of a universal workstation, wherein each of the suspect items is researched to confirm whether or not the suspected item is a duplicate; and
      when said inquiry file contains fewer than the threshold number of suspects that are not false positives, extracting said suspects from said inquiry file and directing said extracted suspects to a second suspect queue of said universal workstation, wherein each of the extracted suspect items is researched to confirm whether or not it is a duplicate.

2. The method of claim 1, further comprising the steps of:
   receiving at a duplicate detection module an inquiry file from any of a plurality of payment channels, said inquiry file containing MICR data for a plurality of items;
   computing a signature for each item from each item's MICR data;
   storing said MICR data and said signature for each item in a database; and
   comparing the signature of each item with the signatures of all earlier items;
   wherein said signature comprises any of a hash, a digest, a checksum and a similarity metric computed from said MICR data.

3. The method of claim 2, wherein said plurality of payment channels comprises;
   a channel for paper items;
   a channel for images captured within a financial institution; and
   at least one distributed image capture channel.

4. The method of claim 1, wherein the step of processing the suspect to confirm that the suspect is a duplicate item comprises the steps of:
   evaluating the suspect against a rule base comprising at least one exclusionary rule to determine when the suspect is a false positive;
   when the suspect is determined to be a false positive, posting the false positive.

5. The method of claim 1, wherein the step of processing the suspect to confirm that it is a duplicate item comprises the steps of:
   retrieving images of an original item and a suspect from an image archive and comparing the images;
   when the images match, confirming the suspect as a duplicate.

6. The method of claim 5, further comprising the steps of:
   when the images do not match, confirming the suspect as a false positive;
   when said suspect cannot be confirmed as a duplicate or a false positive from said comparison of said images, designating said suspect as an indeterminate; and
   posting said false positive and said indeterminate.

7. The method of claim 6, wherein said step of preventing said confirmed suspect from posting comprises the steps of:
   flagging items in said database that have been confirmed as duplicates;
   making a call to said database by a posting module to determine status of an item; and
   removing items flagged as duplicates from a posting stream.

8. The method of claim 7, wherein said step of removing duplicate transit items from a payment stream comprises the steps of:
   directing an inquiry file containing at least one transit item to said duplicate detection module from an item-processing module;
   identifying suspects by comparing a signature of each transit item with items in said database;
   reporting suspects to said item-processing module;
   sorting said suspects into a suspect pocket and sorting remaining transit to a plurality of other pockets by said item-processing module;
   directing suspects to said universal workstation for analysis and disposition;
   reporting disposition of said suspect transit items back to said item-processing module by said duplicate detection module;
   based on said disposition, sorting said suspect pocket to said plurality of other pockets, said plurality of other pockets including a confirmed duplicate pocket and a transit clearing pocket, wherein said confirmed duplicates are removed from said payment stream for further process and each cleared transit item is forwarded to one of a plurality of endpoints.

9. The method of claim 1, wherein said items comprise either deposits or inclearings, further comprising any of the steps of:
- directing confirmed duplicates to a fraud-determination business unit for investigation;
- directing confirmed duplicates to a business unit for making adjustments to customer accounts;
- if a confirmed duplicate inadvertently posts to a customer account, automatically reversing a debit to said customer account and directing inadvertently-posted confirmed duplicate to said business unit for making adjustments; and
- identifying and removing duplicate transit items from a payment stream.

10. The method of claim 1, further comprising the step of determining if the inquiry file contains more than the threshold number of suspects by determining that a number of the suspect items:
- is greater than or equal to 99 percent of all items in said inquiry file;
- is greater than or equal to 50 sequential items in said inquiry file; and/or
- is greater than or equal to 100 items in said inquiry file.

11. The method of claim 10, further comprising the step of upon determining that the threshold number is exceeded:
- marking all items in said inquiry file as duplicates;
- marking a range of items in said inquiry file as duplicates; or
- marking all suspected items in said inquiry file as duplicates.

12. A system for detecting duplicate transactions before final posting comprising:
- a duplicate detection module comprising a processor programmed to compute a signature of a first item presented for payment from the first item's magnetic ink character recognition (MICR) data and compare the signature of the first item presented for payment with the signature of a second item presented for payment and if the signatures collide, designate at least the first item a suspect;
- a universal workstation programmed to facilitate further processing of the suspect to confirm that it is a duplicate, including determining when an inquiry file contains at least one suspect that is not determined to be a false positive, evaluating said inquiry file against a rule base comprising at least one threshold rule:
  - when said inquiry file contains more than a threshold number of suspects that are not false positives, directing said inquiry file to a first suspect queue of a universal workstation, wherein each of the suspect items is researched to confirm whether or not the suspected item is a duplicate; and
  - when said inquiry file contains fewer than the threshold number of suspects that are not false positives, extracting said suspects from said inquiry file and directing said extracted suspects to a second suspect queue of said universal workstation, wherein each of the extracted suspect items is researched to confirm whether or not it is a duplicate; and
- a posting module comprising a processor programmed to prevent confirmed duplicates from being posted while posting unique items.

13. The system of claim 12, further comprising an item-processing module, said item processing module comprising a processor programmed to at forward at least one inquiry file from any of a plurality of payment channels, an inquiry file containing MICR data for a plurality of items; and
- a database for storing said MICR data and said signature for each item;
- said duplicate detection module comparing the signature of each item with the signatures of all earlier items.

14. The system of claim 13, wherein said signature comprises any of a hash, a digest, a checksum and a similarity metric computed from said MICR data.

15. The system of claim 13, wherein said plurality of payment channels comprises:
- a channel for paper items;
- a channel for images captured within a financial institution; and
- at least one distributed image capture channel.

\* \* \* \* \*